US009989795B2

(12) United States Patent
Morioka et al.

(10) Patent No.: US 9,989,795 B2
(45) Date of Patent: Jun. 5, 2018

(54) LIQUID CRYSTAL DISPLAY

(71) Applicant: KYOCERA Corporation, Kyoto (JP)

(72) Inventors: Norikazu Morioka, Tama (JP); Kotaro Nakamura, Daito (JP)

(73) Assignee: KYOCERA Corporation, Kyoto (JP)

( * ) Notice: Subject to any disclaimer, the term of this patent is extended or adjusted under 35 U.S.C. 154(b) by 17 days.

(21) Appl. No.: 14/920,782

(22) Filed: Oct. 22, 2015

(65) Prior Publication Data

US 2016/0041421 A1 Feb. 11, 2016

Related U.S. Application Data

(63) Continuation of application No. PCT/JP2014/061005, filed on Apr. 18, 2014.

(30) Foreign Application Priority Data

Apr. 23, 2013 (JP) .................................. 2013-090374

(51) Int. Cl.
*G02F 1/1333* (2006.01)

(52) U.S. Cl.
CPC .... *G02F 1/133308* (2013.01); *G02F 1/13338* (2013.01)

(58) Field of Classification Search
CPC .............. G02F 1/133308; G02F 2001/133317
See application file for complete search history.

(56) References Cited

U.S. PATENT DOCUMENTS

| 2007/0109462 | A1* | 5/2007 | Lee ..................... G02B 6/0086 349/58 |
| 2008/0297680 | A1* | 12/2008 | Hwang ............ G02F 1/133308 349/58 |
| 2010/0315575 | A1* | 12/2010 | Chang ............... G02F 1/133308 349/62 |
| 2011/0228191 | A1* | 9/2011 | Hsu ..................... G02F 1/13338 349/58 |
| 2014/0248817 | A1 | 9/2014 | Noma et al. |
| 2015/0022753 | A1* | 1/2015 | Akatsuka .......... G02F 1/133308 349/58 |

FOREIGN PATENT DOCUMENTS

| JP | 11-174417 A | 7/1999 |
| JP | 2009-056735 A | 3/2009 |

(Continued)

OTHER PUBLICATIONS

Written Opinion of the International Searching Authority issued by Japan Patent Office for International Application No. PCT/JP2014/061005.

(Continued)

*Primary Examiner* — Phu Vu
(74) *Attorney, Agent, or Firm* — Procopio Cory Hargreaves and Savitch LLP

(57) ABSTRACT

A liquid crystal display comprises a cabinet, a screen panel, a liquid crystal display panel, and a backlight unit. The screen panel is fixed to the cabinet while covering an opening of the cabinet. The liquid crystal display panel is located on a rear side of the screen panel and fixed to the screen panel. The backlight unit is bonded and fixed to the cabinet and is a backlight unit for illuminating the liquid crystal display panel.

9 Claims, 2 Drawing Sheets

(56) References Cited

FOREIGN PATENT DOCUMENTS

| JP | 2010-237493 A | 10/2010 |
| JP | 2013-037104 A | 2/2012 |
| JP | 2012-124000 A | 6/2012 |
| JP | 2012-209087 A | 10/2012 |
| WO | 2013/054503 A1 | 4/2013 |
| WO | 2014/083692 A1 | 6/2014 |

OTHER PUBLICATIONS

International Search Report dated Jul. 15, 2014, issued for International Application No. PCT/JP2014/061005.
Supplementary European Search Report dated Apr. 26, 2016 issued by the European Patent Office for Counterpart European Application No. 13 84 0818.
ECHONET Consortium, ECHONET Lite Specification II ECHONET Lite Communication Middleware Specification, Sep. 3, 2012, pp. 1-52, [XP055112237] URL:http://www.echonet.gr.jp/english/spec/pdf_v100_lite_e/SpecLiteVer.1.0_e_02.pdf [retrieved Apr. 4, 2014].
ECHONET Consortium, ECHONET Specification Appendix Detailed Requirements for ECHONET Device objects, Sep. 3, 2012, pp. i-3-346, [XP055265908] URL:https://echonet.jp/wp/wp-content/uploads/pdf/General/Standard/Release/Release_A_en/SpecAppendixA.pdf [retrieved Apr. 15, 2016].

\* cited by examiner

LIQUID CRYSTAL DISPLAY

CROSS-REFERENCE TO RELATED APPLICATION

The present application is a continuation based on PCT Application No. PCT/JP2014/061005 filed on Apr. 18, 2014, which claims the benefit of Japanese Application No. 2013-090374 filed on Apr. 23, 2013. PCT Application No. PCT/JP2014/061005 is entitled "LIQUID CRYSTAL DISPLAY DEVICE", and Japanese Application No. 2013-090374 is entitled "LIQUID CRYSTAL DISPLAY". The contents of which are incorporated by reference herein in their entirety.

FIELD

Embodiments of the present disclosure relate to a liquid crystal display.

BACKGROUND

Various technologies have conventionally been proposed for liquid crystal displays.

SUMMARY

A liquid crystal display is disclosed. In one embodiment, a liquid crystal display comprises a cabinet, a screen panel, a liquid crystal display panel, and a backlight unit. The screen panel is fixed to the cabinet while covering an opening of the cabinet. The liquid crystal display panel is located on a rear side of the screen panel and fixed to the screen panel. The backlight unit is bonded and fixed to the cabinet and is a backlight unit for illuminating the liquid crystal display panel.

DETAILED DESCRIPTION

A mobile phone according to an embodiment will be specifically described below with reference to the drawings.

Figure 1:
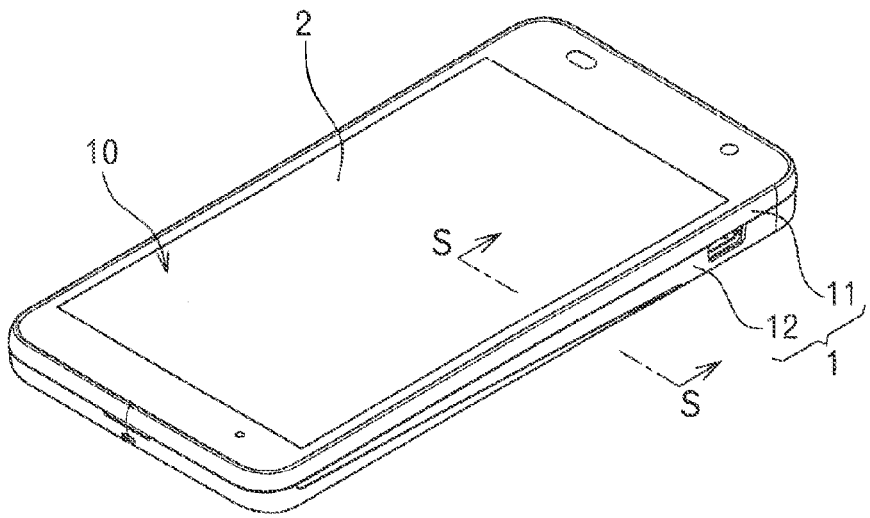
FIG. 1 illustrates a perspective view of a mobile phone.

As illustrated in FIG. 1, the mobile phone comprises a flat housing 1 including a front cabinet 11 and a back cabinet 12 made of synthetic resin. A screen panel 2 made of transparent glass covers a surface of the front cabinet 11. The screen panel 2 forms an image display surface 10.

Figure 2:
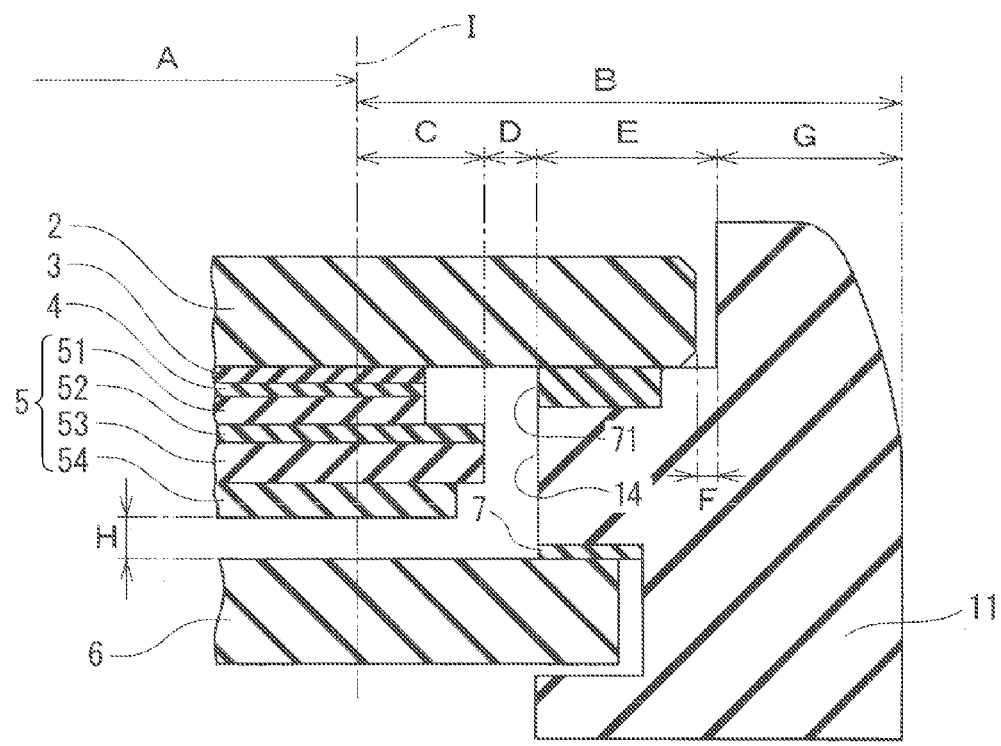
FIG. 2 illustrates an enlarged cross-sectional view taken along the line S-S of FIG. 1.

As illustrated in FIG. 2, in the front cabinet 11 is formed an opening 14 larger than the image display surface 10. The screen panel 2 covers the opening 14 in the front cabinet 11. An outer perimeter of the screen panel 2 is fixed to an opening edge of the housing 1 with an adhesive 71.

A touch-input panel 3 is bonded and fixed to a rear surface of the screen panel 2. A liquid crystal display panel 5 is fixed to a rear surface of the touch-input panel 3 with an adhesive layer 4 therebetween.

The liquid crystal display panel 5 comprises a front polarizing plate 51, a color filter substrate 52 including a color filter and a black mask, an array substrate 53 including a TFT circuit and wiring, and a rear polarizing plate 54. Between the color filter substrate 52 and the array substrate 53 is located a liquid crystal layer (not shown).

On the rear side of the liquid crystal display panel 5, a backlight unit 6 is disposed with a predetermined spacing H (for example, 0.3 mm). An outer perimeter of the backlight unit 6 is fixed to a lateral wall of the front cabinet 11 with a pressure sensitive adhesive double coated tape 7.

The structure of fixing the backlight unit 6 to the front cabinet 11 is not limited to bonding with the pressure sensitive adhesive double coated tape 7 and may be bonding with an adhesive or a fitting structure with the front cabinet 11.

Figure 3:
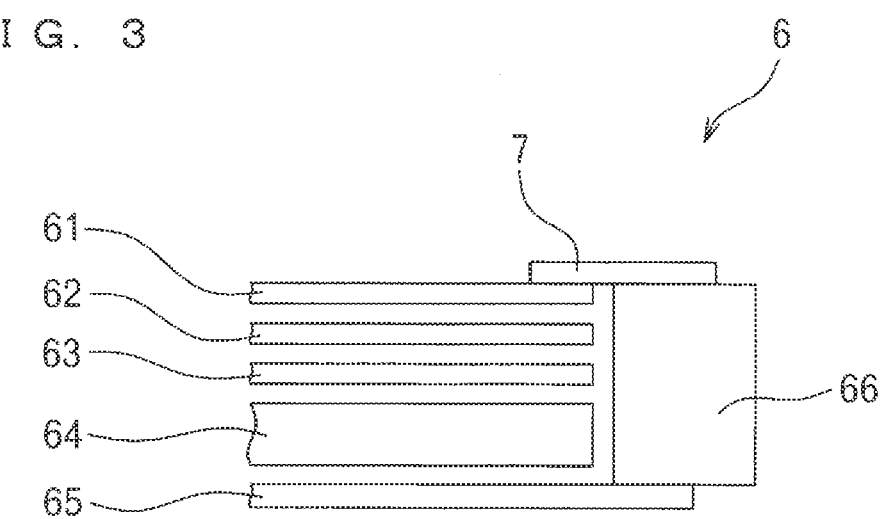
FIG. 3 illustrates a view explaining a laminate film structure of a backlight unit.

As illustrated in FIG. 3, the backlight unit 6 includes a film laminate and a resin molded part 66. The film laminate includes an upper prism 61, a lower prism 62, a diffusion sheet 63, a light guide plate 64, and a reflective sheet 65. The resin molded part 66 includes a plurality of LEDs (not shown) buried therein. The backlight unit 6 is formed into a bendable film in its entirety.

In the mobile phone, a distance C from a boundary I of an effective display area A of the liquid crystal display panel 5 to a lateral edge of the liquid crystal display panel 5 is 0.5 mm. A distance D from the lateral edge of the liquid crystal display panel 5 to an inner wall of the front cabinet 11 is 0.2 mm. A distance E from the inner wall of the front cabinet 11 to an inner wall of an opening edge of the front cabinet 11 is 0.8 mm. A distance G from the inner wall of the opening edge of the front cabinet 11 to an outer wall of the front cabinet 11 is 0.9 mm. A distance F from a lateral edge of the screen panel 2 to the inner wall of the opening edge of the front cabinet 11 is 0.05 mm.

Herein, the distance C (0.5 mm) from the boundary I is a size achieved by narrowing the wiring region (black mask) of the liquid crystal display panel 5.

The distance D (0.2 mm) from the lateral edge of the liquid crystal display panel 5 to the inner wall of the front cabinet 11 is a size that reflects a dimensional tolerance and misalignment of the liquid crystal display panel 5 such that the lateral edge of the liquid crystal display panel 5 does not abut the inner wall of the front cabinet 11.

The distance E (0.8 mm) is a size required for fixing the screen panel 2 to the front cabinet 11 with a sufficient strength.

The distance G (0.9 mm) is a size that reflects the strength or design of the front cabinet 11.

A width B of a frame portion formed outside the effective display area A of the liquid crystal display panel 5 is as extremely small as 2.4 mm.

In an assembly process for the mobile phone, the liquid crystal display panel 5 and the backlight unit 6 are provided to an assembly line while being not fixed to each other but being separated from each other. Consequently, the liquid crystal display panel 5 is fixed to the rear surface of the touch-input panel 3, whereas the backlight unit 6 is fixed to the front cabinet 11.

In the mobile phone, the wiring region (black mask) of the liquid crystal display panel 5 is narrowed to 0.5 mm, and the distance D from the lateral edge of the liquid crystal display panel 5 to the inner wall of the front cabinet 11 is formed to a minimum size (0.2 mm) required for avoiding the lateral edge of the liquid crystal display panel 8 from abutting the inner wall of the front cabinet 13. Therefore, a distance (C+D) from the boundary I of the effective display area A to the inner wall of the front cabinet 11 can be reduced to 0.7 mm, and the width B of the frame portion outside the effective display area A can be reduced to 2.4 mm.

In the mobile phone, a lateral edge of the light guide plate 64 included in the backlight unit 6 is sufficiently apart from the effective display area A of the liquid crystal display panel 5, thereby making it difficult for the reflected light from the lateral edge of the light guide plate 64 to pass through the screen panel 2 to be emitted forward.

The configurations of the respective portions of the present disclosure are not limited to those of one embodiment. For example, though the touch-input panel 3 is fixed to the rear surface of the screen panel 2 and the liquid crystal display panel 5 is fixed to the rear surface of the touch-input panel 3 in one embodiment, the touch-input panel 3 may be omitted, and the liquid crystal display panel 5 may be directly fixed to the rear surface of the screen panel 2. Alternatively, though a mobile phone has been taken as an example of the liquid crystal display in one embodiment, any liquid crystal display that needs a larger display screen is sufficient, particularly because of its small size. For example, the liquid crystal display has applications in a portable personal computer, a portable tablet personal computer with a touch panel, and a liquid crystal screen of a car navigation system.

Alternatively, fixing with a pressure sensitive adhesive double coated tape may be employed instead of fixing with an adhesive, or fixing with an adhesive may be employed instead of fixing with a pressure sensitive adhesive double coated tape.

Further, the dimensions of the respective portions are illustrative and are not limited thereto.

The invention claimed is:

1. A liquid crystal display, comprising:
   a housing having a front cabinet and a back cabinet, the front cabinet having an opening defined by an inner wall, wherein the inner wall is between and orthogonal to an outer perimeter surface and an inner perimeter surface of the front cabinet, and wherein the inner perimeter surface faces an opposite direction than the outer perimeter surface of the front cabinet;
   a screen panel fixed to the front cabinet and covering the opening of the front cabinet;
   a liquid crystal display panel located on a rear side of the screen panel and fixed to the screen panel, the liquid crystal display panel having a lateral edge separated from the inner wall by a non-zero constant spacing; and
   a backlight unit bonded and fixed to the inner perimeter surface of the front cabinet, the backlight unit being a backlight unit for illuminating the liquid crystal display panel, wherein the backlight unit is a different component from the housing.

2. The liquid crystal display according to claim 1, wherein the backlight unit is located apart from the liquid crystal display panel.

3. The liquid crystal display according to claim 1, wherein a touch-input panel is located between the screen panel and the liquid crystal display panel.

4. The liquid crystal display according to claim 1, wherein the constant spacing is 0.2 millimeters (mm).

5. The liquid crystal display according to claim 1, wherein the backlight unit has a film shape.

6. The liquid crystal display according to claim 1, wherein an inner wall surface of the opening of the cabinet includes a recess for insertion of an end portion of the backlight unit.

7. The liquid crystal display according to claim 1, wherein the backlight comprises a film laminate and a resin molded part disposed on a lateral edge of the film laminate, the resin molded part having a plurality of light emitting diodes.

8. The liquid crystal display according to claim 7, wherein the film laminate is comprises a bendable film, the film laminate having an upper prism, a lower prism, a diffusion sheet, a light guide plate, and a reflective sheet.

9. The liquid crystal display according to claim 1, wherein the housing does not comprise a portion sandwiched between the liquid crystal display panel and the backlight unit.

* * * * *